Jan. 12, 1932. R. J. TRAUPMANN 1,840,337
CLUTCH OR BRAKE BAND
Filed Aug. 22, 1929 2 Sheets-Sheet 2
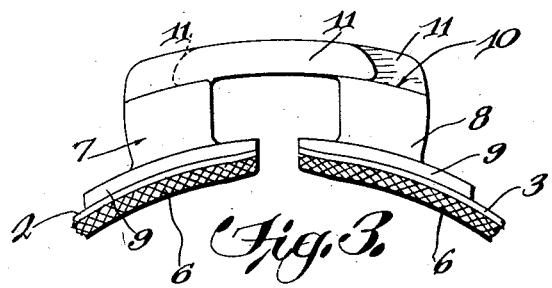
Fig. 3.
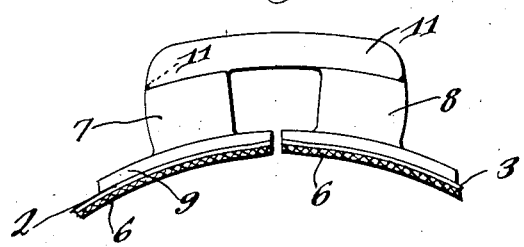
Fig. 4.
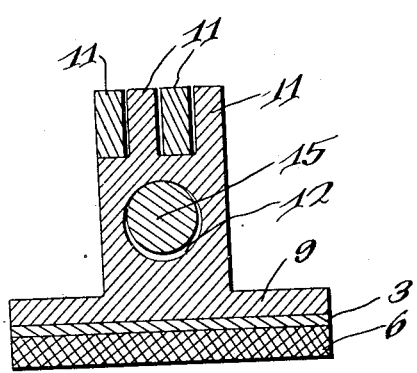
Fig. 5.
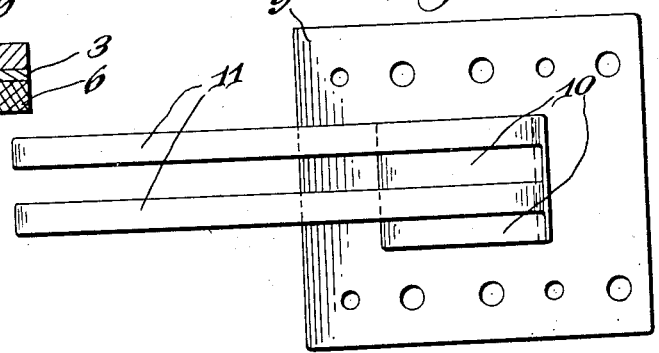
Fig. 6.
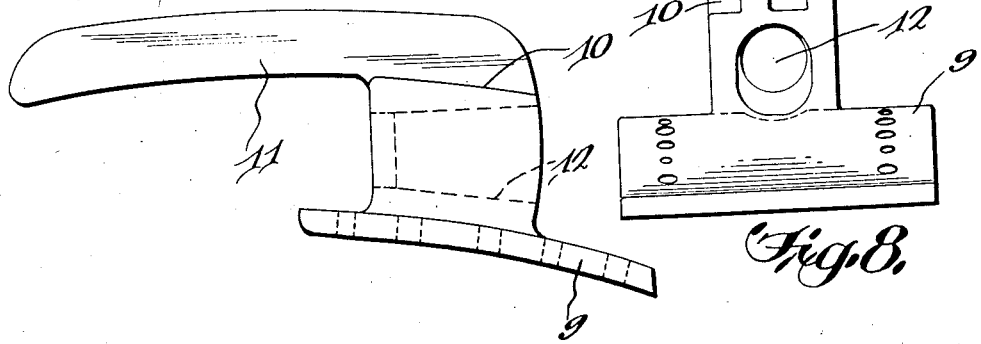
Fig. 7.
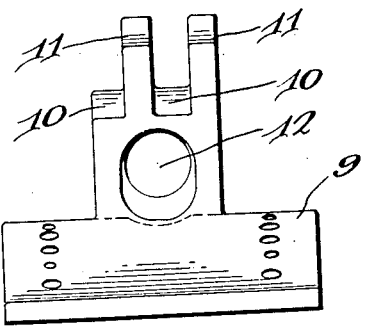
Fig. 8.
Inventor
Raymond J. Traupmann
By Bethune, Hadsell, Zecher,
McKenna and Meshul
Attorneys Patented Jan. 12, 1932

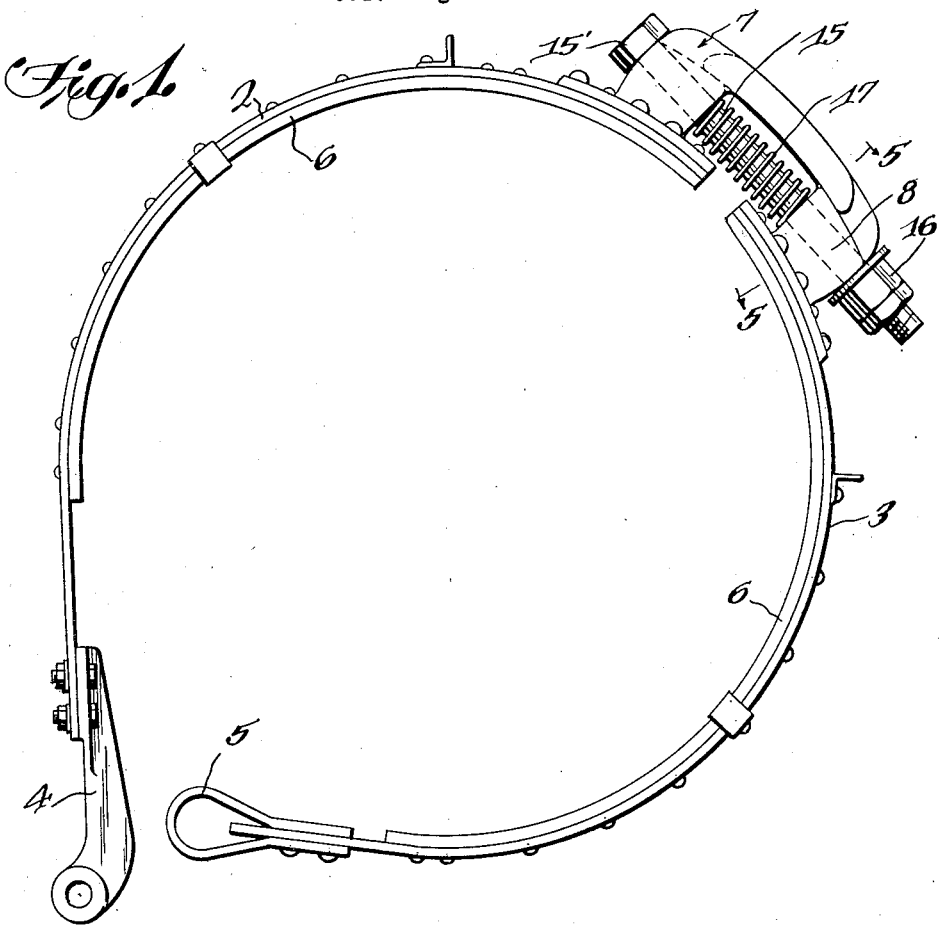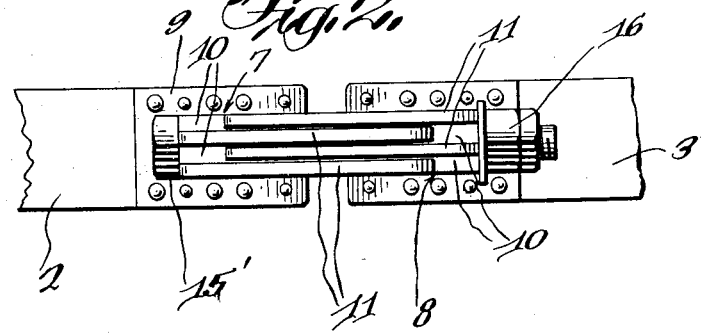

1,840,337

UNITED STATES PATENT OFFICE

RAYMOND J. TRAUPMANN, OF MILWAUKEE, WISCONSIN, ASSIGNOR TO HARNISCH-FEGER CORPORATION, OF MILWAUKEE, WISCONSIN, A CORPORATION OF WISCONSIN

CLUTCH OR BRAKE BAND

Application filed August 22, 1929. Serial No. 387,596.

This invention relates to an improved clutch or brake band and has for one of its principal objects the provision of such a band which is so constructed and organized as to insure, in all adjustments, even and distributed wear over the entire lining of the band and preclude the concentration of wear at any particular places or points on the band.

Another object is to provide a clutch or brake band having the aforestated advantages and capacities and which is of simple and durable construction, reliable and effective in operation, and easily installed and adjusted.

One type of clutch or brake band widely used is made up of a pair of sections, the adjacent or meeting ends of which carry outwardly projecting lugs united by an adjusting device. In this type of band the adjusting device in drawing the lugs together also forces them inwardly and thus concentrates excessive pressure on the portions of the band lining underlying the lugs. This results in accelerated or rapid wearing away of the lining adjacent the meeting ends of the bands so that long before the main portion of the lining is so worn to any material degree the ends are practically worn out or at least worn to such an extent as to necessitate replacement of the entire lining. This, of course, shortens the life of a lining and makes necessary expense and labor that would otherwise be avoided.

While the present invention provides a sectional band with lugs at the meeting ends of the band sections united by an adjusting device, the lugs are so interengaged or organized as to preclude the adjusting device, in any adjustment, from increasing the pressure on the portions of the lining underlying the lugs. On the contrary, the interengaging means provided between the lugs constrains the band sections to adjustment toward and away from each other in a path that lies in the circumference of the band. In this way the wear on the lining of the band is uniform and distributed over the entire area of the lining.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a view in side elevation showing a band construction embodying the present invention;

Figure 2 is a fragmentary view in top plan of the interlocking lug arrangement provided between the band sections;

Figure 3 is a view thereof in side elevation, the adjusting device being omitted and the band being shown with a new lining;

Figure 4 is a view similar to Figure 3 but illustrating the position of the interlocking lug arrangement when the lining is worn and the lugs adjusted accordingly;

Figure 5 is a view in section taken on line 5—5 of Figure 1;

Figure 6 is a plan view of the interlocking lugs; and

Figures 7 and 8 are views in side and end elevation, respectively, of the lug shown in Figure 6.

Referring to the drawings, it will be seen that the band embodying the present invention is made up of sections 2 and 3. The section 2 has an arm 4 attached to one end thereof and adapted for connection with the conventional band operating mechanism (not shown) while the section 3 has a loop 5 secured thereto to provide for the anchoring of the band. The band sections have the usual lining sections 6 secured thereto in the usual manner.

At the meeting ends of the band sections, lugs designated generally at 7 and 8 are provided, the lugs 7 and 8 being of identical construction although reversely arranged in the assembly. Each lug has a base 9 riveted to its band end. The top of the body of each lug is provided with arcuate guiding surfaces 10 concentric with the mean circumference of the band and also has integrally formed therewith arcuate guiding arms 11 which project laterally from the lug and which are concentric with the band. A bolt hole or aperture 12 is formed in the body of each lug.

In the assembly the curved guide arms 11 of both lugs are interfitted with the guide arms 11 of lug 7 riding on the guide surfaces 10 of lug 8 and the guide arms 11 of lug 8 riding on the guide surfaces 10 of the lug 7.

An adjusting device is provided between the lugs 7 and 8 and comprises a bolt 15 extended through the bolt holes 12 of the lugs and having its head 15' engaged with the lug 7. A nut and washer assembly 16 is adjustably mounted on the other end of the bolt, the nuts being threadedly connected to the bolt and forcing the washer against the lug 8. A coil spring 17 under suitable compressions encircles the bolt between the lugs 7 and 8 and has its opposite ends engaging these lugs.

The coacting guide arms 11 and guide surfaces 10 constrain the band sections to movement toward and away from each other in a path that lies in the circumference of the band when the band sections are adjusted by adjusting the nut and washer assembly 16 on the bolt 15. In this way the adjustment effected is precluded from forcing the adjacent ends of the band section inwardly towards the drum (not shown) with which the band is associated thereby precluding excessive wear of the lining adjacent the meeting ends of the band and insuring uniform and distributed wear and efficient braking action. Figure 3 illustrates the relative position of the arms and guides when the band is new and Figure 4 illustrates the position of these parts when the band is partially worn. From these two views and Figure 1 it will be understood that as the nut and washer assembly 16 is taken up the curved guide arms 11 increasingly overlap the curved guide surfaces 10 and always act to constrain the band sections to movement in a path lying in the band's circumference. From the drawings it will be understood that the guide arms and guide surfaces of each lug are so positioned and related that the lugs are interchangeable, that is, may be used on either band section.

The invention claimed is:

1. A band made up of a plurality of sections, a lug secured to each section of the band adjacent the meeting ends of the sections, and interengaging means on the lugs constraining the band sections to move toward and away from each other in a path lying in the mean circumference of the band.

2. A band made up of a plurality of sections, a lug secured to each section of the band adjacent the meeting ends of the sections, each lug having an arcuate guide surface and also having an interlocking arcuate guide arm projecting beyond the end of its section in the assembly, the arm of one lug engaging the guide surface of the other.

3. A band comprising a pair of sections, a pair of interchangeable lugs secured to the meeting ends of the sections, each lug having a pair of guide surfaces and a pair of spaced interlocking arms, the interlocking arms of one lug interfitting with the arms and slidably engaging the guide surfaces of the other.

4. A band made up of a plurality of sections, a lug secured to each section of the band adjacent the meeting ends of the sections, interengaging means on the lugs constraining the band sections to move toward and away from each other in a path lying in the mean circumference of the band and an adjusting device co-acting with the lugs to cause the band sections to move circumferentially relative to each other.

5. A band made up of a plurality of sections, a lug secured to each section of the band adjacent the meeting ends of the sections, each lug having an arcuate guide surface and also having an interlocking arcuate guide arm projecting beyond the ends of its section in the assembly, the arm of one lug engaging the guide surface of the other, said lugs being apertured, a bolt engaged with one and extending through the apertures of both lugs, a nut threaded on the bolt and engaging the other lug for moving the lugs toward each other and a spring on the bolt and engaged with and tending to urge the lugs apart.

6. A band made up of a plurality of sections, an adjusting device for moving adjacent ends of the sections toward and away from each other and means for constraining the sections when adjusted under the influence of the adjusting device to move toward and away from each other in a path lying in the mean circumference of the band.

7. A band made up of a plurality of sections, a lug secured to each section of the band adjacent the meeting ends of the sections, each lug having spaced arcuate guide surfaces on its outer portion and having guide arms adjacent the guide surfaces, said guide arms being of arcuate form and projecting beyond their lugs, said arms being interfitted and engaged with said guide surfaces in the assembly, and an adjusting device coacting with the lugs to move the same toward and away from each other, said guide arms and said guide surfaces constraining the band sections to move in a path lying in the mean circumference of the band when moved under the influence of the adjusting device.

8. A band made up of a plurality of sections, a lug secured to each section of the band adjacent the meeting ends of the sections, each lug having an arcuate guide surface and also having an interlocking arcuate guide arm projecting beyond the end of its section in the assembly, the arm of one lug engaging the guide surface of the other, and an adjusting device coacting with the lugs to move the same toward and away from each other, said guide arms and guide surface constraining the band sections to move in a path lying in the mean circumference of the band when the band sections are moved under the influence of the adjusting device.

In witness whereof, I hereto affix my signature.

RAYMOND J. TRAUPMANN.